March 10, 1970 J. W. PROSS, JR 3,500,383

BINARY TO BINARY CODED DECIMAL CONVERSION APPARATUS

Filed Oct. 31, 1966

INVENTOR.
JOHN W. PROSS JR.

BY Karl A. Ohralik

ATTORNEY

United States Patent Office 3,500,383

Patented Mar. 10, 1970

3,500,383

BINARY TO BINARY CODED DECIMAL CONVERSION APPARATUS

John W. Pross, Jr., Newfoundland, N.J., assignor to Singer-General Precision, Inc., a corporation of Delaware Filed Oct. 31, 1966, Ser. No. 590,567
Int. Cl. G06f 5/00
U.S. Cl. 340—347 7 Claims

ABSTRACT OF THE DISCLOSURE

The conversion is performed with the divide logic circuitry of a conventional digital computer wherein the binary number to be converted is the dividend and a plurality of constants from a predetermined set are successively used as divisors. A first constant is used for four successive partial divisions and then a second constant is used for the next four partial divisions and so on, utilizing a different constant for each order of binary coded decimal digit whereby each partial division determines one bit of a binary coded decimal digit. The constants are judiciously selected and scaled so that each is less than one and when taken together form a geometric progression wherein constants after the first are each 1.6 times as great as the last preceding constant.

Figures 1, 2:
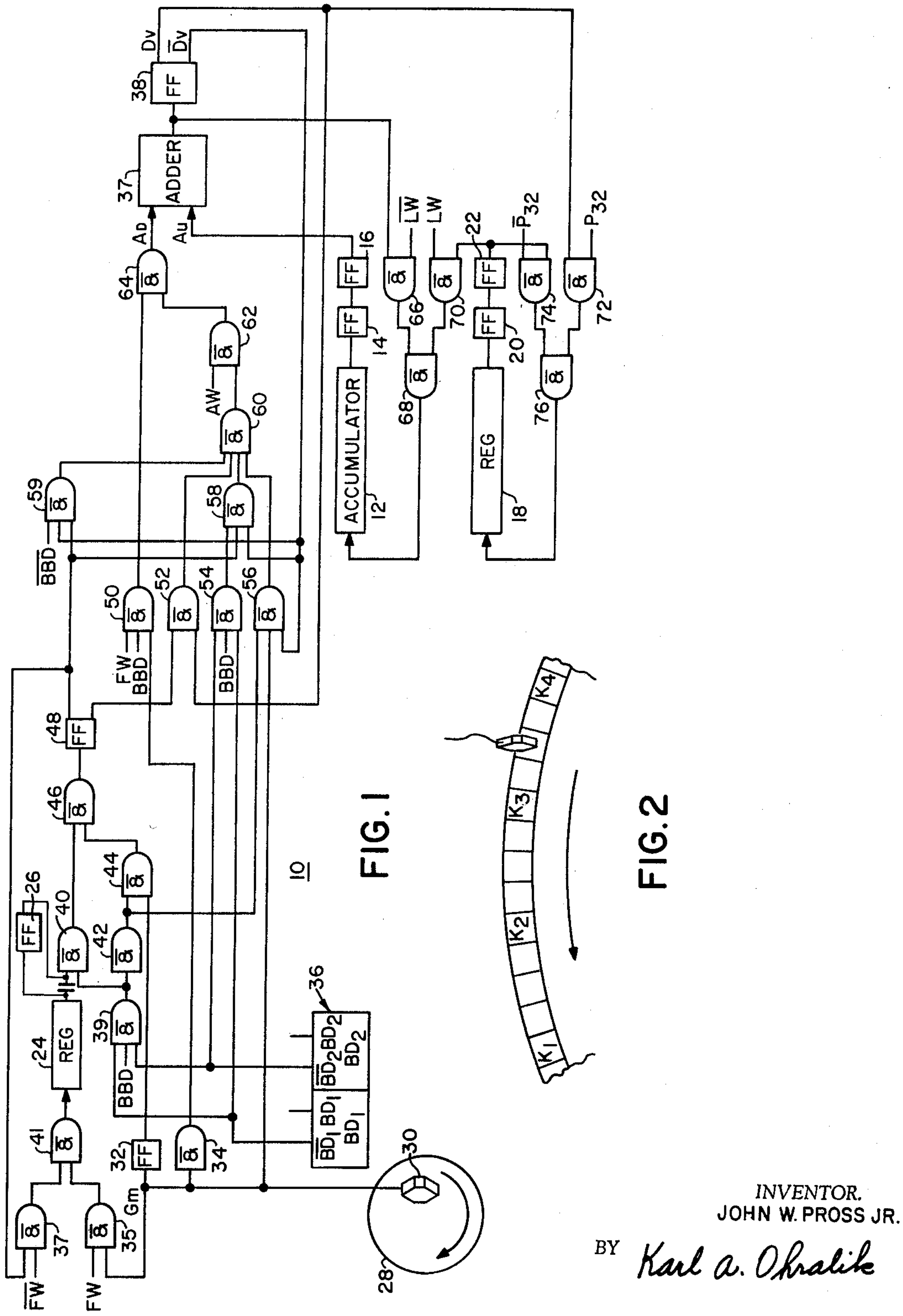

This invention relates to conversion of fractional numbers of one radix to equivalent numbers of different radix and more particularly to the conversion of numbers of radix 2 to equivalent numbers of radix 10.

In modern electronic computers the binary number system, i.e., the system with radix 2, has found widespread use because of the great facility with which binary numbers may be processed by electronic logic circuitry. On the other hand, the decimal number system is used almost universally for purposes other than data processing and is the system most familiar to nearly all persons. Thus, it is necessary that in a computer employing the binary number system for data processing, the output of the computer present its information in decimal form, necessitating a conversion from binary numbers as used within the computer to decimal numbers as used for external display or print out as the computer output.

Many types of apparatus for performing such conversion have been devised heretofore and have been effective in converting binary numbers to equivalent decimal numbers. These converters have typically added to the computer logic circuitry to perform the conversion at a stage of the data processing wherein it is necessary to have such information for display or other external purposes. These converters have added to the complexity and cost of the computer as a whole.

Alternatively, conversion of binary numbers to equivalent decimal numbers has been achieved in computing systems by the use of computing components useful for other computer functions. However, in these cases, more complex programming is required, such as the requirement for a separate instruction for the use of each constant of several constants used in a conversion operation.

It is a principal object of this invention to facilitate the conversion of binary numbers to equivalent binary coded decimal numbers, in a computer having an arithmetic unit for performing the arithmetic function of division, with the requirement of only miminal additional logic circuitry for performing the conversion function.

It is another object of this invention to effect conversion of binary fractional numbers to equivalent binary coded decimal numbers in a computing system and without the requirement of complex programming instructions.

It is another object of this invention to facilitate the conversion of binary fractional numbers to equivalent binary coded decimal numbers by the use of different constants as divisors and without the requirement of a separate instruction for the use of each constant.

In accordance with this invention, the conversion of binary to decimal numbers is carried out with logic circuitry capable of performing the divide operation of the computer. Predetermined contsants are stored in a certain section of computer memory and each or four times its value is successively used as divisor of a binary number for determining a bit forming the digit representing the weight of a different order of ten of the decimal number.

In the first step of the conversion operation, the binary number is altered by a subtraction from it of the first constant and thereafter during each succeeding conversion step each succeeding remainder is altered by a subtraction from it or addition to it, depending on its sign; following each alteration, irrespective of type, the remainder is shifted left one order. In each case, if the remainder is positive the next alteration performed is a subtraction of four times the appropriate constant. If the result is negative, the alteration is an addition. However, in the case of a negative sign, the amount added to the result is four times the value of the constant only in cases for determining the second, third and fourth bits of any BCD digit. In these circumstances, for determining the first bit of a digit, the value of the constant itself is added. It may be shown that this is tantamount to a restore, left shift and subtraction of four times the value of the new constant. Following each alteration, if the remainder is positive, a one bit is stored as a partial quotient and if the result is negative, a zero bit is stored. The bits of the partial quotients are left shifted for each alteration and in the aggregate, form the binary coded decimal result. This operation is repeated until the required number of decimal digits is obtained from the binary number involved. By appropriate computer construction facilitating this procedure, essentially the same apparatus is used for conversion as well as the ordinary division operation without a separate instruction for each constant used as a divisor.

In accordance with this invention, the sored constants bear a predetermined relation to each other wherein each successive constant is 1.6 times the last previous constant. However, a further requirement is that no constant be so large as to overflow in the accumulator register in response to a left shift operation. This, therefore, requires that each constant be less than one and of the form $$K_i = \frac{16}{10} K_{i-1}$$

and hence $$K_i = \left(\frac{16}{10}\right)^{i-1} (K_1)$$

wherein $K_1$ is the first constant used.

The manner in which a set of constants for converting a fractional binary number to a binary coded decimal equivalent is derived, will now be described. In a conversion of binary to binary coded decimal numbers, since the highest order bit of the highest decimal digit of the resultant binary coded decimal number represents .8, the binary equivalent of this value would be first subtracted from the binary number. Next, the binary equivalent of .4 would be subtracted from the resultant difference and, in this succession, the equivalent of .2 and .1 would be subtracted from the respective differences. Due consideration, of course, would be given to an overdraw in which case a restoration or the equivalent thereof would be made. After determining the respective bits which make up the digit representing $10^{-1}$, the binary equivalents of .08, .04, .02, and .01 would be next subtracted from the remaining respective differences to determine the weight of the digit of the order $10^{-2}$. In this manner, the respective binary coded decimal bits would be determined to determine the respective decimal numerals. It is noted, however, that in performing a divide type operation in a computer, a necessary shift operation of the minuend in each case is required so that the subtrahend may be subtracted from the appropriate order. In effectively subtracting .8, .4, .2 and .1, four left shifts are required. This is the case for each decimal digit. In the present circumstances, therefore, to prevent an overflow from the left extremity of a register, it is necessary to scale the minuend and the subtrahend. It is seen that for each four left shifts of an accumulator containing the binary number which is to be converted, an effective multiplication by the value $2^4$ or 16 takes place. On the other hand, each successive set of four bits is one-tenth the value of the preceding set of bits and, therefore, each constant differs by the factor 16/10 or 1.6 from the last preceding constant. A family of constants which bear this required relationship is reproduced below in Table I wherein K is equal to the weight of the constant corresponding to the most significant decimal digit. As mentioned above, the weight of this constant should be 0.8, but this would render the remaining constants too large for processing in the computer (i.e., each must be less than 0.25). Hence further scaling may be required. For example, for ease of computation let a scale factor of $2^4$ be chosen: Then $$K=\frac{0.8}{2^4}=0.05$$

and the binary number being converted must be similarly scaled as by a right shift of four bit positions, for example, which is, of course, equivalent to division by $2^4$.

TABLE I

| Decimal character: | Operand |
|---|---|
| $C_1$=MSB | K |
| $C_2$ | 0.4K |
| $C_3$ | 0.64K |
| $C_4$ | 1.024K |
| $C_5$ | 1.6384K |
| $C_6$ | 2.62144K |
| $C_7$=LSB | 4.194304K |

In this manner, a family of constants, $K_i$, each one equal to 1.6 times the last preceding one may be derived suitable for converting a pure binary number into a BCD equivalent having, say, seven decimal digits. Thus, the first constant for determining the weight of the numeral of the first order, that is the $10^{-1}$ order, would be .8 scaled by a division of $2^4$, yielding the constant .05. The next constant for determining the weight or the numeral of the $10^{-2}$ order would be .8 scaled by a division of $2^4$; however, this number is shifted to the left four places, thus multiplying by $2^4$, yielding the value .08.

Other and further objects and advantages of this invention will become apparent from the following detailed description thereof taken with the accompanying drawings in which:

FIGURE 1 is a schematic diagram showing a portion of the logic circuitry of a computing system which is effective to perform a binary to binary coded decimal conversion of fractional numbers, as well as the computer divide operation, and FIGURE 2 is a view of a portion of the magnetic storage disk forming the memory of a computer and containing on one track thereof the constants used as "divisors" for performing a binary to binary coded decimal conversion.

While this invention has general application in the sense that the principle involved may be applied in various computer environments, one particular environment in which it has been applied is a general purpose computer which handles and processes data serial by bit and by word, low order first, with 32 usable bits per word, the last one of which is a sign bit. All data is scaled to fractional numbers and negative numbers are represented in 2's complement form. In the data processing, the computer operates in several phases, three of which are first word phase, additional word phase and last word phase. The duration of first word phase and last word phase is one word time, but additional word phase may last several word times the initiation or sequencing of the computer's various phases are controlled by suitable logic signals derived from the computer's control unit which, in turn, are generated under instructions by the computer program. Thus, in the case of a divide operation, the number of additional word times is 32, but in a binary to BCD conversion operation, the number of additional word times is programmable and depends on the number of BCD digits required.

As in most general purpose digital computers, the computer of the present invention is basically organized around a memory store, an I/O unit, a control unit, and an arithmetic unit. In operation, a prepared set of instructions stored in the computer's memory (i.e., the computer program) interacts with the control unit in a known manner whereby the latter generates various logic or control signals for governing the operation of the arithmetic unit as preferred. It is to be understood therefore, that the exact method of obtaining the logic signals required in the present invention is completely arbitrary and forms no part of the present invention. Moreover, in the present case, the conversion operation as mentioned above, is based upon the conventional divide operation of the computer; hence, for simplicity of presentation, a detailed description of those parts of the computer not involved in this operation have been omitted herein. Suffice it to say, that only those portions of the computer and in particular, those portions of the computer's arithmetic unit which are essential for a full understanding of the divide function as it relates to the novel concepts of the present invention are shown in the accompanying drawings.

Referring now more particularly to the drawings for a more detailed description of the invention in FIGURE 1, 10 represeits generally the logic circuitry for performing the arithmetic functions of a computer. The circuit 10 includes three registers. A first register 12 may be considered the accumulator register in which an operand is contained and after a computing operation, it is the register in which the result is stored. This register is extended by a pair of bistable elements 14 and 16 which may be flip flop circuits. The register 12 in the present operation would be useful for storing the binary number which is to be converted into an equivalent binary coded decimal number and, thus, which is of the character of a dividend in a division operation. A second register 18 is provided and this register is also extended by a pair of bistable devices 20 and 22 which may also be flip flop circuits. The register 18 is useful for storing the quotient in a division operation and, thus, in the present circumstances is useful for storing the bits of the binary coded decimal result. A third register 24 is useful for storing the divisor in a division operation and in the present circumstances is used for temporarily storing the constants, each of which is used during four different word times for performing partial division operations of a binary number. This register also is extended one order by a bistable circuit 26, which may also be a flip flop circuit.

Each of the registers 12, 18 and 24 comprises a plurality of bistable units and is capable of shifting the contents therein, either to the right or left, under appropriate control as is well known, the reader's attention being invited, for example, to "High-Speed Computing Devices" published by McGraw-Hill in 1950, page 299. The number of bistable stages of each register is sufficient to contain all of the digits of a binary number utilized in computations.

Permanent memory is provided by a magnetic storage disk 28, which is rotatable in a known manner and which contains a plurality of tracks on which bits of information are stored. Among the tracks is one which stores the constants useful for the partial divisions and which is shown more clearly in FIGURE 2 of the drawings. As seen in FIGURE 2, a first constant $k_1$ is stored in a particular location and spaced four words away is stored the constant $k_2$. In this manner, every four words, a different constant is stored in the same track. For reading information or the constants from the storage disk 28 is a magnetic head 30 placed adjacent to the track which information is to be read and forming the input to a bistable flip flop circuit 32 and to NAND gate circuits 34 and 35. And although a disc memory is preferred for use with the present invention because of its relative economy it will be understood that other memory systems may be used alternatively as well. For example, the constants $K_i$ could be stored on a preselected track of a rotating magnetic memory drum, it being necessary only that the constants be spaced at four word intervals thereon. Rotating disc memories and drum memories are described in the "Computing Handbook" published by McGraw-Hill in 1962, on pages 12–31 to 12–34.

The bistable flip flop circuit components, as shown in FIGURE 1, are capable of assuming two different states of equilibrium; a set state and a reset state. Although each has a pair of inputs, both of which must be conditioned for the flip flop to change state, for brevity and simplicity of explanation, only a signal input line is shown, it being assumed that the other input line in each case is appropriately conditioned. Thus, the flip flop circuit is responsive to signals representing a certain binary value on this input line to assume or remain in one of the mentioned states and to signals representing the other binary value on this line, to assume or remain in the other of the mentioned states. The flip flops are shown as having one or two outputs. The sole output, and one output in cases wherein a pair are provided, will reflect the state of equilibrium of the circuit and, thus, the input signal is translated, but delayed one bit interval. The other output in cases wherein a pair are provided reflects the inverse of the first output. For a detailed description of such flip flop circuits reference is made to the aforementioned "High-Speed Computing Devices," pages 15 through 17. The NAND gate, of the type shown at 34, is an AND invert circuit, which is responsive to a false input at any one or more of its input terminals to produce a true output. Stated otherwise, a logical zero presented at any one or more of its inputs produces a logical one at its output.

A NAND circuit suitable for use with the present invention is described in "Digital Computer Fundamentals" published by Prentice-Hall in 1965, on pages 77 and 78 thereof. As may be understood by those skilled in the art, the memory disc 28 or the memory drum, if one is used instead, will have a clock track having a bit recorded in each position. These bits are used to generate clocking or timing signals for all flip flops and shift registers in the computer. The latter's operation proceeds at a rate determined by the rate the bits are read from the clock track, which, in turn, is determined by the disc or drum speed.

A four step binary counter is provided for accessing the conversion constants $K_i$ from memory every four word times, or stated more specifically, for sequencing the withdrawal of a new constant from the storage disc 28 each four word times. Counter 36 includes a pair of separate flip flop stages designated $BD_1$ and $BD_2$, respectively, and is responsive to an input pulse for changing its state. Thus, the output of each stage may be designated $BD_1$, $\overline{BD}_1$ and $BD_2$, $\overline{BD}_2$, respectively, and the counter may have four distinct states as given, for example, by the following truth table:

TABLE II

| | $BD_1$ | $BD_2$ | |
|---|---|---|---|
| $\overline{BD_1}$ | 0 | 0 | $\overline{BD_2}$ |
| $\overline{BD_1}$ | 0 | 1 | $BD_2$ |
| $BD_1$ | 1 | 1 | $BD_2$ |
| $BD_1$ | 1 | 0 | $\overline{BD_2}$ |
| $\overline{BD_1}$ | 0 | 0 | $\overline{BD}$ |

In operation, the four step counter 36 is incremented by a signal $P_0$ obtained from the computer's control unit and signifying each of the computer's minor cycles or word times. Thus, in the present case where each data word comprises 31 bits plus a sign bit, the $P_0$ signal may be obtained from another binary counter or "bit counter" (not shown) which has six flip flop stages and 33 distinct states and therefore is adapted to count down from $P_{32}$, $P_{31}$, . . . etc., to $P_0$. This "bit" counter will be advanced each clock time. Since the four state counter $BD_1$–$BD_2$ is incremented every $P_0$ it will be reset to its 00 or $\overline{BD}_1$ $\overline{BD}_2$ state every fourth word time as indicated in Table II. Binary counters of the type described herein are fully disclosed in "High-Speed Computing Devices" on pages 17 through 19.

A conventional full adder 37 is provided for performing the arithmetic computations of the circuit 10. One such adder suitable for use with the present invention is fully described in "Understanding Digital Computers" by Paul Siegel, published by John Wiley and Sons, Inc., in 1961, page 302. A flip flop circuit 38 has its input connected to the carry trigger of adder 37 and serves to provide an indication of the partial results of the additions by the adder. Thus, the adder's carry trigger is effective to set this flip flop if the result of an arithmetic operation and the operand are the same while the flip flop is reset otherwise. It is clear, therefore, that in response to a successful subtraction, the remainder has the same sign as the operand, whereby the flip flop 38 is set and, in response to an overdraw, the signs are different and flip flop 38 remains reset. When flip flop 38 is set its output may be designated $D_v$ and when it is reset, its output may be designated $D_v$.

Another NAND gate 39 is provided having three inputs to which are applied signals BBD, $\overline{BD}_1$ and $\overline{BD}_2$. The signal BBD is a logical 1 during binary-to-BCD conversion operations and a logical 0 during divide operations. The output of NAND gate 39 is applied to one input of NAND gate 40, the other input of which is connected to the output of the bistable flip flop circuit 26. Another NAND gate 42, having a single input and thus serving as pure inverter, has its input connected to the output of NAND gate 39. A NAND gate 44 has its two inputs connected, respectively, to the output of NAND gate 42 and the output of bistable flip flop 32 which receives information from memory. The outputs of NAND gates 40 and 44 form the respective inputs to a NAND gate 46, the output of which is connected to the input of a bistable flip flop 48. The output of flip flop circuit 48 provides an input to register 24 for recirculating the data in this register under appropriate circumstances, as shown. In Boolean terms, the input to bistable circuit 48 is $$[(\overline{BBD}+BD_1+BD_2)\cdot F/F26+\overline{BD}_1\cdot\overline{BD}_2\cdot F/F_{32}\cdot BBD)]$$

wherein $F/F_{32}$ represents memory storage delayed one bit time. Thus, it is observed from this expression that the bistable flip flop circuit 48 receives information from register 24 at its input during a divide operation or when either of the counter stages $BD_1$ or $BD_2$ is true or, in other words, at intermediate stages of a word interval and receives information during conversion operations from memory when both of the stages of the counter $BD_1$ or $BD_2$ are false, or, in other words, at the beginning of a four word interval.

As noted hereinabove, the register 24 is used for containing the divisor during a divide operation or for containing the constants during a conversion operation. During the first word time of an operation, either divide or a conversion, data information, either a divisor or constants, is transferred from storage disk 28 to register 24. To facilitate such a transfer, a pair of NAND gates 37 and 41 are cooperable with NAND gate 35 to control such a transfer. NAND gate 37 receives, at its two inputs, the output of flip flop circuit 48 and a signal $\overline{FW}$ designating not first word, which is a signal generated in the computer under instruction by the computer's stored program and is a logical 1 when the computer is not in a first word phase. The NAND gate 35 receives, at its other input, the complement of such signal, namely, FW designating first word and which is a logical 1 during first word phase of the machine. The outputs of NAND gates 35 and 37 form the respective inputs to NAND gate 41 and the output of this NAND gate forms the input to register 24. In Boolean terms, the input to this register is $FW\cdot G_m+\overline{FW}F/F_{48}$, indicating that during FW data is read from memory into the register and at other times the register contained data is recirculated. The contents of memory whether it be a divisor or a conversion constant $K_i$ is represented by the symbol $G_m$.

For further controlling the addend input to the adder 37 from either the register 24 or from the memory unit 28, NAND circuits 50, 52, 54, 56, 58, 59, 60, 62 and 64 are provided. The inputs to NAND circuit 50 are FW, representing a signal which is true during the first word of an appropriate operation; BBD, which is a true signal during binary to binary coded decimal operation, and $\overline{G}_m$, which is derived from the output of NAND circuit 34 and representing the inverse of memory output. The inputs to NAND circuit 52 are $D_v$ and $\overline{F/F}_{48}$ which are derived, respectively, from the flip flops $D_v$ and $F/F_{48}$. The NAND circuit 54 has as it inputs $\overline{BD}_1$ and $\overline{BD}_2$ which are taken from the corresponding outputs of the counter 36. The inputs to NAND circuit 56 are the output of NAND gate 42, $G_m$ and $\overline{D}_v$, the latter of which is taken from the false output of the flip flop 38. The NAND circuit 58 receives as its inputs the output of NAND circuit 54, the true output of flip flop 48 and 38. The NAND circuit has three inputs receiving signals $\overline{BBD}$, $\overline{D}_v$ and the output $F/F_{48}$ of flip flop 48. The NAND circuit 60 receives as its inputs the outputs of NAND circuits 52, 56, 58 and 59 and provides one input of the NAND circuit 62, the other of which is AW, representing a signal which is true during additional word times of corresponding computations. The NAND circuit 64 receives as its inputs the outputs of NAND circuits 50 and 62. The Boolean expression representing the output of NAND circuit 64 is $$FW\cdot\overline{G}_m\cdot BBD+AW\cdot D_{v1}\cdot\overline{F/F}_{48}+AW\cdot BBD(BD_1+BD_2)\cdot\overline{D}_{v1}\cdot F/F_{48}+AW\cdot BBD\cdot\overline{BD}_1\cdot\overline{BD}_2\cdot\overline{D}_v\cdot G_m$$

The first term of this expression, namely, $FW\cdot\overline{G}_m\cdot BBD$, shows that during the first word interval and in a conversion operation the complement of memory is applied into the addend input of adder 37. This is to perform a subtraction which, in the present circumstances, is accomplished by adding the 2's complement of a number. Since a 2's complement is equal to a 1's complement plus a 1 bit in the least significant bit position, the 2's complement is obtained by complementing each digit and setting the carry trigger of adder 37 at $P_0$. The second term of the Boolean expression, namely, $AW\cdot D_v\cdot\overline{F/F}_{48}$, shows that during additional word time, if the last remainder or the last result of an arithmetic operation was positive, the contents of the register 24 is complemented in preparation for another subtraction since a subtraction operation is always performed when the last result was positive. The third term, namely, $AW\cdot BBD(BD_1+BD_2)\overline{D}_v\cdot F/F_{48}$, illustrates that during additional word time in a conversion operation and at times other than at the end of a four-word interval, if a result of an arithmetic operation is negative, an addition is performed without complementing the contents of register 24. And, lastly, the fourth term, namely, $AW\cdot BBD\cdot\overline{BD}_1\cdot\overline{BD}_2\cdot\overline{D}_v\cdot G_m$ illustrates that during additional word time and at the beginning of a four-word interval, if the last remainder is negative, an addition of the next constant taken from memory is performed.

The output of flip-flop circuit 16 forms a direct input to the augend input of the adder 37.

For recirculating the information and placing it back into the accumulator register 12 after processing in the adder circuit 37, the output of the adder is applied to one input of a NAND gate 66, the other input of which is $\overline{LW}$, indicating not last word, that is to say, that at times other than the last word time of the computer, the information is recirculated into register 12. The output of NAND gate 66 is applied to one input of NAND gate 68. Another NAND gate 70 receives at its respective inputs the signals LW, representing the last word, and the output of bistable flip flop 22. The output of NAND gate 62 forms the second input to the NAND gate 68. In Boolean terms, the output of gate 68 is $$S\cdot\overline{LW}+F/F_{22}\cdot LW$$

which indicates that at word times other than the last word time the output of the adder represented by the letter S, for sum, is applied to the input of the accumulator and that at last word times, the contents of register 18, which would be the result of a conversion, is placed into the accumulator register 12.

For forming the conversion result in register 18, the output of the bistable flip flop circuit 38 forms one input of a NAND gate 72, the other input of which receives the signal P32 representing the last bit time of any word. Another NAND gate 74 receives at its respective inputs $\overline{P32}$ and the output of bistable flip flop circuit 22. The outputs of circuits 72 and 74 form the respective inputs of NAND gate 76 and the output of this NAND gate is applied to the input of register 18. In Boolean terms, the output of NAND gate 76 is $\overline{P32}\cdot 22+D_v\cdot P32$. This indicates that at times other than the last bit time of any word, the contents of the register 18 is recirculated and that at the last bit time of any word, a new partial quotient received from bistable flip flop circuit $D_v$ is introduced into this quotient register 18.

In the operation of the circuit, shown in FIGURE 1, for either a divide operation or a binary to BCD conversion operation, initially a dividend or binary number to be converted is introduced into the accumulator register 12. During the first word of operation, the divisor, in case of a divide operation, or an appropriate constant, in the case of a conversion operation, is taken from memory and placed into the register 24. The register 18 is cleared and the contents of memory is subtracted from the contents of the accumulator register 12, and the result is placed back into the accumulator register. If the result of this subtraction is negative, the flip flop circuit 38 is reset and if the subtraction results in a positive remainder, the flip flop is set. Following this subtraction operation, the contents of the register 18 is shifted to the left one digit and if flip flop circuit 38 is reset, a zero is introduced in the least significant bit position of this register 18; if the flip flop 38 is set, a one bit is placed in a least significant bit position of this register. During the conversion operation, and in the case wherein flip flop circuit 38 has been reset due to a negative result of a subtraction operation, and in a case wherein the flip flop circuits $BD_1$ and $BD_2$ are not both reset, indicating an intermediate time of a 4 word interval, the shifted contents of the accumulator register and the contents of the register 24, namely, the constant utilized for conversion, are added and placed back into the accumulator register. At the same time the contents of the register 24 is recirculated. In the alternative case, wherein the flip flops $BD_1$ and $BD_2$ are both reset, the shifted contents of the assumulator register 12 and the contents of memory, namely, the new constant utilized for conversion are added and placed back into the accumulator register. Also, by virtue of a four-bit delay, the contents of memory being the new constant utilized for conversion is placed into the register 24.

In the situation wherein, due to the first subtraction, the flip flop circuit 38 was set indicating a successful subtraction, and the flip flop circuits $BD_1$ and $BD_2$ are not both reset, the contents of register 24 is subtracted from the shifted contents of the accumulator register 12 and the result placed back into the accumulator register. Again, the contents of register 24 is recirculated. In the alternative case, when both flip flops $BD_1$ and $BD_2$ are reset, indicating the beginning for a four word interval, four times the contents of memory is subtracted from the shifted contents of the accumulator register 12, and the result placed back into the accumulator register. At the same time, the contents of memory is muliplied by four by a two-bit delay and the result placed into the register 24. This is done by passing the contents of memory through flip flops 32 and 48 proir to being entered into register 24 and/or the $A_D$ input of adder 37. Since each flip flop 32 and 48 represents a delay of one bit position, $G_m$ is effectively delayed by two bit positions, or in other words multiplied by four. Therefore in the case where $\overline{BD_1}$ and $\overline{BD_2}$ obtain and a conversion operation is taking place, either the next constant is added to the shifted remainder in the accumulator or four times the constant is subtracted from it depending on whether the remainder is negative or positive, respectively. Thereafter, four times the constant is used until $BD_1$, $BD_2$ is true again.

In the case of any one of the four described alternatives, the result of the arithmetic operation produces a negative result, the flip flop circuit 38 is utilized to introduce either a zero bit or one bit in the next least significant bit position of the register 18. When the operation is completed, utilizing all of the different constants, as in the form of divisors, the contents of the register 18 is placed back into the accumulator which thus holds the result of the conversion operation.

In a divide operation, a similar procedure is followed with the exception that the condition of the flip flop circuits $BD_1$ and $BD_2$ plays no part in the division and the same divisor is used through thirty-three different word times during each of which an arithmetic operation, either subtraction or addition, depending upon the condition of the flip flop circuit 38, is performed.

In order to more fully explain the novel conversion technique of the present invention, reference is made to the following table wherein an example is given in detail for the conversion of the pure binary number 0.01011100101011000000 to its BCD equivalent of 0.361+.

TABLE III

Binary Number=0.0101110010101100000=0.361+

| | | | Result in Register 18 |
|---|---|---|---|
| | 0.00000101110010101100 | scaled by $2^4$ | |
| FW− | 0.00001100110011001101 | subtract $K_1$ | |
| | 1.11111000111111011111 | negative | 0 |
| | 1.11110001111110111110 | shift | |
| AW+ | 0.00001100110011001101 | add $K_1$ | |
| | 1.11111110110010001011 | negative | 00 |
| | 1.11111101100100010110 | shift | |
| AW+ | 0.00001100110011001101 | add $K_1$ | |
| | 0.00001010010111100011 | positive | 001 |
| | 0.00010100101111000110 | shift | |
| AW− | 0.00001100110011001101 | subtract $K_1$ | |
| | 0.00000111111011111001 | positive | 0011 |
| | 0.00001111110111110010 | shift | |
| AW− | 0.00010100011110110000 | subtract $4K_2$ | |
| | 1.11111011011001000010 | negative | 00110 |
| | 1.11110110110010000100 | shift | |
| AW+ | 0.00010100011110110000 | add $4K_2$ | |
| | 0.00001011010000110100 | positive | 001101 |
| | 0.00010110100001101000 | shift | |
| AW− | 0.00010100011110110000 | subtract $4K_2$ | |
| | 0.00000010000010111000 | positive | 0011011 |
| | 0.00000100000101110000 | shift | |
| AW− | 0.00010100011110110000 | subtract $4K_2$ | |
| | 1.11101111100111000000 | negative | 00110110 |
| | 1.11011111001110000000 | shift | |
| AW+ | 0.00001000001100010010 | add $K_3$ | |
| | 1.11100111011010010010 | negative | 001101100 |
| | 1.11001110110100100100 | shift | |
| AW+ | 0.00100000110001001000 | add $4K_3$ | |
| | 1.11101111100101101100 | negative | 0011011000 |
| | 1.11011111001011011000 | shift | |
| AW+ | 0.00100000110001001000 | add $4K_3$ | |
| | 1.11111111111100100000 | negative | 00110110000 |
| | 1.11111111111001000000 | shift | |
| AW | 0.00100000110001001000 | add $4K_3$ | |
| | 0.00100000101010001000 | positive | 001101100001 |

It may be seen from the example in Table III that the pure binary number being converted is loaded into the A register and shifted right four places. This is done so that the binary number is properly scaled to agree with the constants derived from Table I, which, as pointed out hereinabove were originally scaled by dividing through by $2^4$. At the beginning of the computer's FW phase, counter 36 will be accessed from memory and loaded into register 24. Simultaneously, the operand is subtracted from the pure binary number in register 12. Since the remainder of this subtraction is negative, flip flop 36 will remain reset indicating that during the next wordtime the constant will be added to the remainder and a zero is shifted into the least significant bit position of register 18. during the second wordtime of the operation (first wordtime in AW phase), the remainder in the accumulator is left shielded and the constant $K_1$ added thereto. The new remainder is still negative, hence another zero is shifted into the LSB position of register 18 indicating that the next operation will be another addition. Finally, in the second wordtime of AW, the addition of $K_1$ to the shifted remainder in the A register yields a positive remainder. This causes flip flop 38 to set indicating that the next operation will once more be a subtraction and shifts a "one" into the LSB position of register 18. In the example, the final alteration by $K_1$, i.e., a subtraction, produces a positive remainder. Therefore, flip flop 38 remains set and another "one" is shifted into the LSB position of register 18. At $P_0$ of the third wordtime in AW, the first four alterations of the binary number by the first constant $K_1$ have been completed and the result in register 18 namely, 0011, represents the BCD form of the converted number's highest ordered character; that is, a decimal three. Also, the binary counter 36 is incremented to its reset or 00 state ($\overline{BD_1}\ \overline{BD_2}$). Therefore, the next constant $K_2$ is accessed from memory. However, since the fourth alteration corresponding to the first constant $K_1$ produced a positive reminder, $K_2$ must be multiplied by four before being subtracted from the shifted remainder. This is accomplished by reading the contents of memory through flip flops 32 and 48 effective to delay $G_m$ by two bit positions or multiply it by four. Thereafter, the remainder in register 12 is altered four times in succession in the same manner above to derive the BCD digit of next highest order, the only difference being that a constant equal to four times $K_2$ is used rather than $K_2$. That is, if flip flop 38 is set the next alteration will be a subtraction; whereas if flip flop 38 is reset the next alteration will be an addition. At $P_0$ of the seven wordtime in AW, binary counter 36 is once more incremented to its 00 state. However, in the given example, the fourth alteration of the binary remainder in register 12 corresponding to the operand $K_2$ yields a negative result, and therefore, the first alteration corresponding to the derivation of the BCD digit of third highest order requires addition of a constant equal to $K_3$. In this case, the constant $K_3$ is accessed from memory and read directly thru NAND gates 56, 60, 62, and 64 into the adder's $A_D$ logic. Thereafter, and as indicated in Table III, for the second, third and fourth alterations in this series a constant equal to $4K_3$ is used whether or not addition or subtraction thereof is required. The quantity $4K_3$ circulates in register 24 during the eighth thru eleventh wordtimes of AW and is read into the $A_D$ logic flip flop 48. Thus, the given example clearly illustrates that a different constant is used for addition than that for subtraction when $\overline{BD_1}\ \overline{BD_2}$ is true. This, of course, is necessary to perform the "restore" operation when a new constant is accessed, and requires the known relationship between one constant and the next, all of which is accounted for by the requirements shown in Table I.

While the present invention has been described in a preferred embodimen, it will be obvious to those skilled in the art that various modifications can be made therein within the scope of the invention, and it is intended that the appended claims cover all such modifications.

What is claimed is:

1. An apparatus for converting binary fractional numbers to equivalent binary coded decimal numbers comprising a register means for storing a binary fractional number, memory storage means containing a plurality of constants, said constants forming a geometric progression wherein each constant is 1.6 times the last preceding constant, means for performing four steps of a partial division of the contents of said register with the first of said constants as a divisor and means for successively performing four steps of a partial division of the partial dividend formed in said register with each of the remaining constants as a divisor in progressively increasing order and storage means responsive to said partial divisions to form a quotient representing, in binary coded decimal form, the equivalent to said binary number originally stored in said register means.

2. An apparatus for converting binary fractional numbers to equivalent binary coded decimal numbers comprising a first shift register for temporarily storing a fractional binary number, memory storage means containing a plurality of constants, said constants each being less than one and forming a geometric progression wherein each constant is 1.6 times the last preceding constant, means for detecting the sign of the contents of said first shift register and means responsive to means including said detecting means for successively altering the contents of said register four times by an amount proportional to each of said constants and means for shifting the contents of said register left one bit position following each alteration, said altering means being responsive to a positive sign of said detecting means to perform a subtraction operation of a corresponding constant and responsive to a negative sign of said detecting means to perform an addition operation of a corresponding constant during the next succeeding alteration, second shift register means, means for shifting the contents of said second shift register means left following each alteration and means responsive to each alteration for setting a one bit in a predetermined order of said second shift register means in response to a positive indication of said detecting means and a zero bit in response to a negative indication of said detection means whereby upon completion of the four alterations by each of said constants, said second register contains the binary coded decimal equivalent to a binary number contained in said first register prior to said alterations.

3. A method of converting binary numbers to equivalent binary coded decimal numbers comprising the steps of storing a plurality of constants equal in number to the number of decimal digits to be produced, the constants being less than one and forming a geometric progression wherein each constant is 1.6 times as great as the last preceding constant, altering the binary number four times by the quantity of each of said constants in increasing order and shifting said binary number to one high order after each alteration, each successive alteration being a subtraction from the result of the immediately preceeding alteration if said result is positive or an addition to said result if negative, producing a partial quotient of zero for each alteration producing a negative result and a one for each alteration producing a positive result and storing said partial quotients in the order received to produce a binary coded decimal number equivalent to the original binary number.

4. An apparatus for converting binary fractional numbers to equivalent binary coded decimal numbers as set forth in claim 1 and wherein the first constant is less than one and greater than zero and each of the succeeding constants is less than one-fourth.

5. An apparatus, according to claim 2, wherein the first of said constants is less than one and greater than zero and each succeeding constant is less than one-fourth.

6. An apparatus according to claim 1 additionally comprising means for detecting the sign of the dividend following each partial division, means responsive to a positive sign indication in said sign detecting means for entering a "1" bit into the least significant bit position of said storage means responsive to said partial divisions and responsive to a negative sign indication for entering a "0" bit into the least significant bit position of said storage means, and means for shifting left the contents of said storage means following each partial division.

7. An apparatus according to claim 1 additionally comprising a four step counter and a further register, gating means interposed between said memory storage means and said further register and being responsive to said counter for entering a new constant into said further storage means every four counts of said counter, said means for performing and said means for successively performing being operatively coupled to said further register means.

References Cited

UNITED STATES PATENTS

| | | | |
|---|---|---|---|
| 3,082,950 | 3/1963 | Hogan | 340—347 |
| 3,257,547 | 6/1966 | Bernstein | 235—155 |
| 3,373,269 | 3/1968 | Rathbun et al. | 235—155 |

MAYNARD R. WILBUR, Primary Examiner
JEREMIAH GLASSMAN, Assistant Examiner

U.S. Cl. X.R.

235—155

PO-1050 (5/69)

UNITED STATES PATENT OFFICE
CERTIFICATE OF CORRECTION

Patent No. 3,500,383 Dated 3/10/70

Inventor(s) John W. Pross, Jr.

It is certified that error appears in the above-identified patent and that said Letters Patent are hereby corrected as shown below:

Column 2, line 16, correct the spelling of "constants".
Column 5, line 31, insert --from-- between "track" and "which".
Column 6, line 26, change "$\overline{BD}$" to --$\overline{BD}_2$-- (4th column of Table II).
Column 9, line 24, correct the spelling of "accumulator".
Column 9, line 37, change the word "when" to --wherein--.
Column 9, line 67, change the word "through" to --throughout--.
Column 10, line 47, capitalize the word "during".
Column 10, line 49, change the word "shielded" to --shifted--.
Column 11, line 30, correct the spelling of "embodiment".

SIGNED AND SEALED
JUL 28 1970

(SEAL)
Attest:

Edward M. Fletcher, Jr.
Attesting Officer

WILLIAM E. SCHUYLER, JR.
Commissioner of Patents